United States Patent
Pepe et al.

(10) Patent No.: US 7,390,025 B2
(45) Date of Patent: Jun. 24, 2008

(54) SECONDARY LATCH/VERIFIER FOR A QUICK CONNECTOR

(75) Inventors: Richard M. Pepe, Macomb, MI (US); Jim Kerin, Grosse Pointe Woods, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 259 days.

(21) Appl. No.: 11/087,358

(22) Filed: Mar. 23, 2005

(65) Prior Publication Data

US 2005/0218650 A1    Oct. 6, 2005

Related U.S. Application Data

(63) Continuation-in-part of application No. 10/814,314, filed on Mar. 31, 2004, now abandoned.

(51) Int. Cl.
   *F16L 37/00* (2006.01)
(52) U.S. Cl. .............................. 285/93; 285/305; 285/82
(58) Field of Classification Search ................. 285/305, 285/93, 320, 82, 319
   See application file for complete search history.

(56) References Cited

U.S. PATENT DOCUMENTS

| | | | |
|---|---|---|---|
| 4,869,534 A | * | 9/1989 | Ketcham et al. ............... 285/24 |
| 4,913,467 A | * | 4/1990 | Washizu ....................... 285/39 |
| 4,948,175 A | | 8/1990 | Bartholomew |
| 5,395,140 A | | 3/1995 | Wiethorn |
| 5,401,063 A | | 3/1995 | Plosz |
| 5,423,577 A | | 6/1995 | Ketcham |
| 5,586,792 A | | 12/1996 | Kalahasthy et al. |
| 5,593,187 A | | 1/1997 | Okuda et al. |
| 5,628,531 A | | 5/1997 | Rosenberg et al. |
| 5,649,724 A | | 7/1997 | Wiethorn |
| 5,725,257 A | * | 3/1998 | Sakane et al. ................. 285/81 |
| 5,782,502 A | | 7/1998 | Lewis |
| 5,855,398 A | | 1/1999 | Reinholz |
| 5,863,077 A | | 1/1999 | Szabo et al. |
| 5,897,145 A | | 4/1999 | Kondo et al. |
| 6,082,779 A | | 7/2000 | Lesser et al. |
| 6,846,021 B2 | | 1/2005 | Rhode et al. |
| 2003/0178844 A1 | | 9/2003 | Klinger et al. |

FOREIGN PATENT DOCUMENTS

EP          0593937 A1    9/1993

* cited by examiner

*Primary Examiner*—David E Bochna
(74) *Attorney, Agent, or Firm*—Leydig, Voit & Mayer, Ltd

(57) ABSTRACT

A quick connector coupling comprising a female connector body, a tubular male member, a primary retainer and a secondary latch/verifier. The female connector body has a through bore and transverse slots open to the bore. The male tubular member with an annular upset extends into the through bore. The primary retainer is disposed within the slots and releasably connects the male member to the connector body. The secondary latch/verifier is disposed in the slots and is releasably coupled to the connector body and moveable between latched position in which it precludes release of the primary retainer and an unlatched position. In one form, the secondary latch includes a retainer beam arranged to move the secondary latch to its unlatched position on insertion of the male member. In another form the secondary latch/verifier includes externally positioned verifier and additional latch to releasably retain the male member.

51 Claims, 11 Drawing Sheets

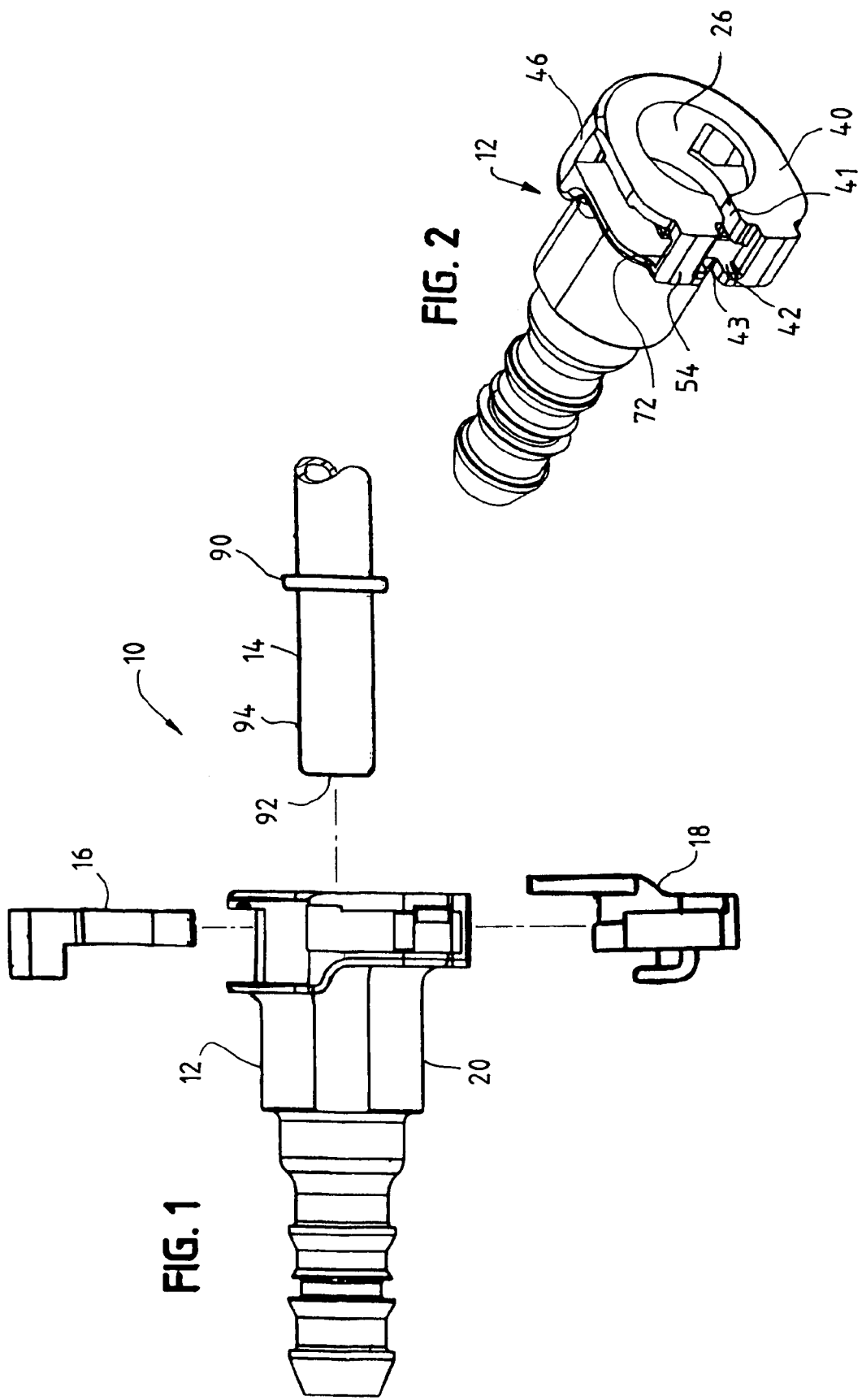

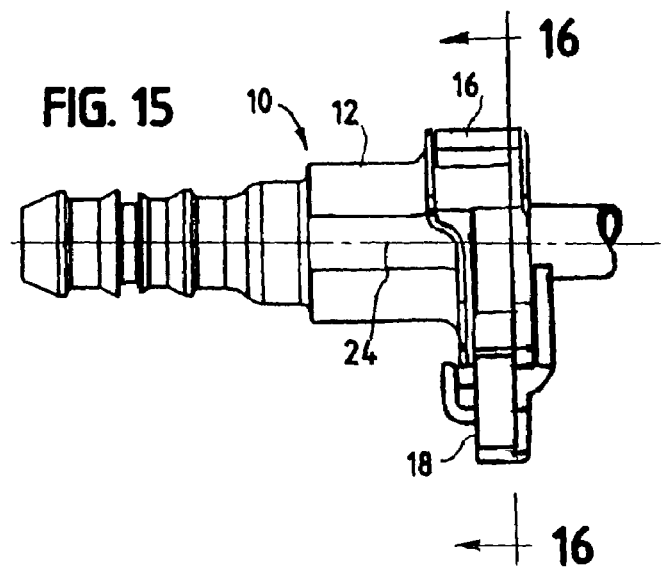
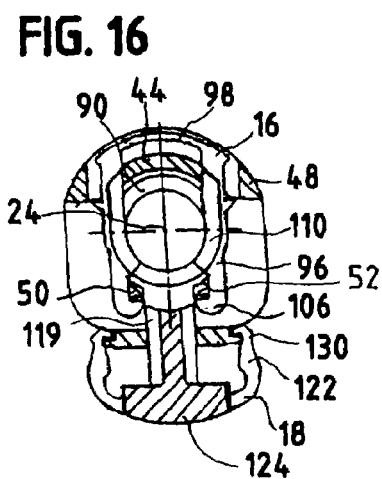
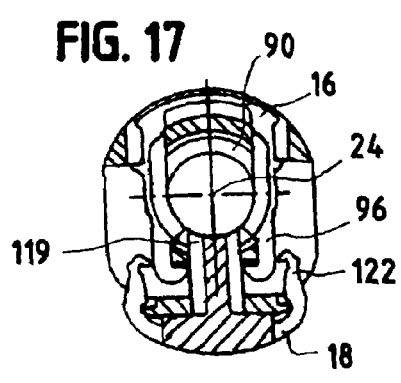
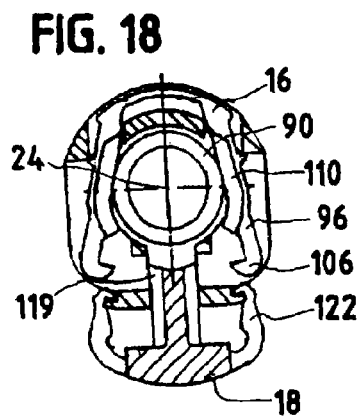

SECONDARY LATCH/VERIFIER FOR A QUICK CONNECTOR

This application is a continuation-in-part of application Ser. No. 10/814,314 filed on Mar. 31, 2004 now abandoned.

BACKGROUND OF THE INVENTION

This invention relates to fluid line systems which include quick connector couplings, and more particularly to a quick connector coupling having a secondary latch/verifier.

In automotive and other fields, quick connector couplings, which generally include a male member received and sealingly retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

A number of methods and mechanisms exist for securing the male member and female connector body of a quick connector coupling together. One type of retention mechanism involves the use of a retainer disposed within the connector body. The retainer has load-bearing members extending between a radial face formed within the connector body and an enlarged upset formed on the male member, thereby securing the male member within the connector body. One drawback of this type of retainer is that separation of the coupling is usually difficult to attain. A special release tool or sleeve is often required to disconnect the joint.

Another type of retention mechanism involves use of a retainer in the form of a retention clip inserted through slots formed in the exterior of the connector body. Beams extending through the slots are poised between the male member upset and the rearward surfaces defining the slots, thereby preventing disconnection of the coupling. Due to the physical appearance of such retainers, they are referred to in the trade as "horseshoe" retainers. An example of this type of retainer is found in U.S. Pat. No. 5,586,792, to Kalahasthy et al., which is herein incorporated by reference. The "horseshoe" retainer, disclosed in the '792 Patent, permits easy release of the coupling without significantly increasing the complexity of the coupling. The quick connector coupling of the present invention is an improvement of the type of retainer disclosed in the '792 Patent by using a secondary latch/verifier which prevents unintentional release of the coupling, provides verification that the coupling is properly connected and prevents the disconnection of the coupling should the primary horseshoe retainer fail.

BRIEF DESCRIPTION OF THE DRAWINGS

FIG. 1 is an exploded view of a quick connector coupling according to the present invention;

FIG. 2 is a perspective view of the female connector body of FIG. 1;

FIG. 15 is a side view of the coupling of FIG. 1, with the primary retainer in the locked position and the secondary latch/verifier in the unlatched position;

FIG. 16 is a sectional view of the coupling of FIG. 15, taken through line 16-16;

FIG. 17 is a sectional view of the coupling of FIG. 1, with the primary retainer in the locked position and the secondary latch/verifier in the latched position; and FIG. 18 is a sectional view of the coupling of FIG. 1, with the primary retainer in the released position and the secondary latch/verifier in the unlatched position.

DETAILED DESCRIPTION OF THE ILLUSTRATED EMBODIMENTS

The quick connector coupling of the present invention is illustrated in connection with a fluid line system. It is shown as a releasable connection between a rigid tube and other fluid carrying components, particularly a flexible hose. However, the coupling has numerous other applications where a fluid tight, but releasable connection is desired, such as connection of rigid elements of a fluid path, whether pressurized, or unpressurized. An example is a fuel filler pipe arrangement for a vehicle. Another is a plumbing drain line arrangement.

Figure 14:
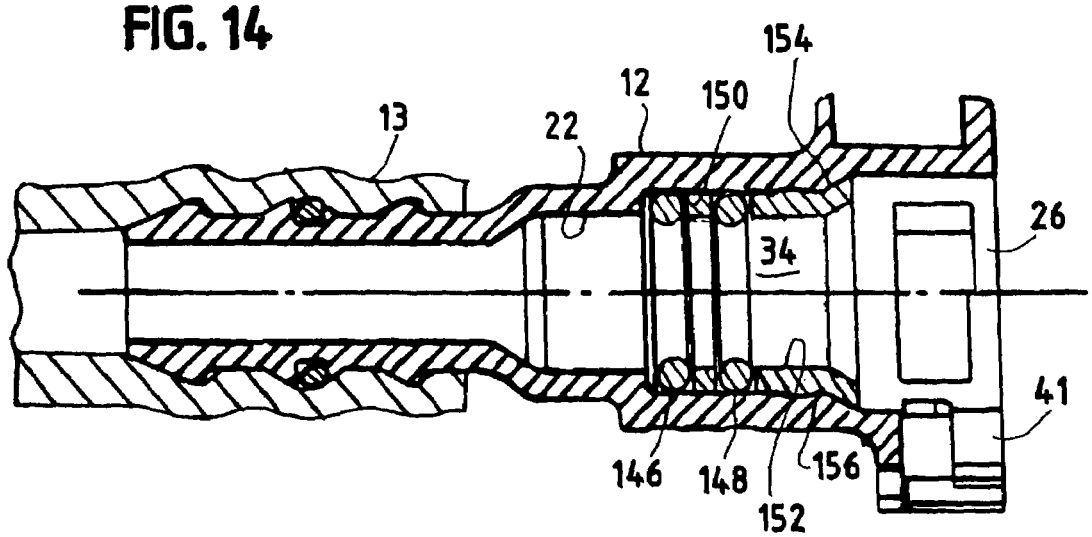
FIG. 14 is a sectional view of the connector body of FIG. 1 with sealing elements in the sealing chamber.

FIG. 1 illustrates a quick connector coupling 10 formed in a fluid line. The coupling 10 is comprised of a generally cylindrical female connector body 12 and a male member 14 secured together by a primary retainer member 16 and a separate secondary latch/verifier member 18. The male member 14 is formed at an end of a hollow tube which forms a part of a fluid line system. In use, the female connector body 12 is connected to a tubing or hose 13 (as illustrated in FIG. 14) which is also a part of the fluid line system. The female connector body 12 and the male member 14 are connectable to form a permanent, but severable, joint in the fluid line.

The connector body 12 is illustrated in detail in FIGS. 2-6. The connector body 12 is defined by a generally cylindrical, stepped exterior wall 20 and a generally cylindrical, stepped interior wall 22. The connector body 12 is centered about an axis 24, and is preferably made of a plastic material, such as polyamide. The interior wall 22 defines a through bore 26. The bore 26 extends completely through the connector body 12, from a larger diameter, male member reception end 28 to a smaller diameter, hose connection end 30.

Variations in the diameter of interior wall 22 of connector body 12 divide bore 26 into four distinct sections. Moving axially inward from the male member reception end 28 to the hose connector end 30, they are: retainer housing section 32, seal chamber 34, tube end receptacle 36, and fluid passageway 38.

The retainer housing section 32 is adjacent to the male member reception end 28. It is defined by a C-shaped outer rim 40 connected to an inner rim 42 by a top support member 44, two side support members 46,48, two center support members 50,52, and two bottom support members 54,56. An outer rim slot 41 is defined at the bottom of the C-shaped outer rim 40. A notch 43 is defined at the bottom of the inner rim 42. The spaces between the top support member 44 and the two side support members 46,48 define two top slots 58,60. The spaces between the two side support members 46,48 and bottom support members 54,56 define two side slots 62,64. The space between the two bottom support members 54,56 defines a bottom slot 66. The top slots 58,60 receive and position the primary retainer 16 transversely to the central axis 24 of the connector body 12. The side slots 62,64 and the bottom slot 66 receive and position the secondary latch/verifier 18 transversely to central axis 24 of the connector body. The top support member 44 defines a curved upper surface 45. Each of the center support member 50,52 defines a locking shoulder 68,70. A locking ridge 72,74 extends laterally from the outer edge of each bottom support member 54,56.

The seal chamber 34 is formed axially inward of the retainer housing section 32. It is defined by a reduced diameter portion of interior wall 22, relative to the retainer housing section 32, extending axially inward from a conical shoulder 78 to a radial shoulder 80. The seal chamber 34 is provided to house sealing elements to form a fluid seal between the connector body 12 and the male member 14.

The tube end receptacle 36 is formed axially inward of the seal chamber 34. It is defined by a reduced diameter portion of interior wall 22, relative to seal chamber 34, which extends axially inward from the small diameter end of radial shoulder 80 to a conical shoulder 82. The tube end receptacle 36 is provided to receive an open end of the male member 14.

The fluid passageway 38 is defined by the smallest diameter portion of interior wall 22. It leads from the small diameter end of conical shoulder 82 to hose connection end 30. The portion of exterior wall 20 surrounding fluid passageway 38 is configured to facilitate connection to another component in the fluid line. The illustrated connector body 12, for example, is specially formed for connection to a flexible hose. A conical nose 84 is formed adjacent end 30 to facilitate insertion into a flexible hose, and ramped barbs 86 are formed outward of nose 84 to retain the hose on the connector body. A groove 88 is defined to house an exterior O-ring seal, if desired.

Alternative exterior configurations could be employed around the fluid passageway end of connector body 12 for connection to other system arrangements. Threads, for example, could be formed in exterior wall 20 to facilitate connection within a threaded bore of a housing containing a system component.

As illustrated in FIG. 1, the male member 14 is formed at the end of a rigid tube. It includes a radially enlarged upset 90 formed a given distance from an open tube end 92. The tube end 92 can be rounded or tapered to make insertion of the male member 14 into the connector body 12 less difficult. A smooth, cylindrical sealing surface 94 extends between the upset 90 and the tube end 92. The outer diameter of sealing surface 94 should be such that the end of male member 14 fits snugly within the tube end receptacle 36.

Figure 3:
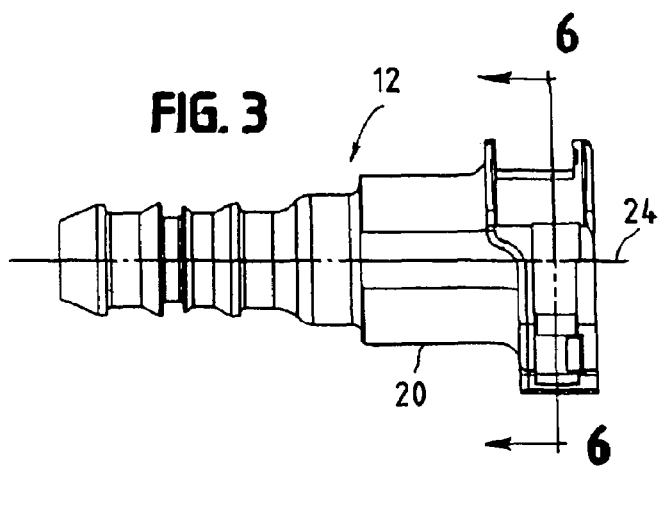
FIG. 3 is a side view of the female connector body of FIG. 2.
Figure 4:
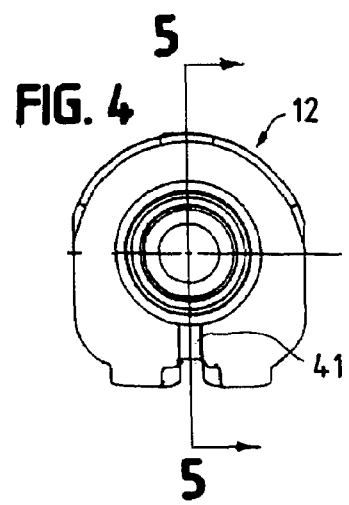
FIG. 4 is a rear view of the female connector body of FIG. 2.
Figure 5:
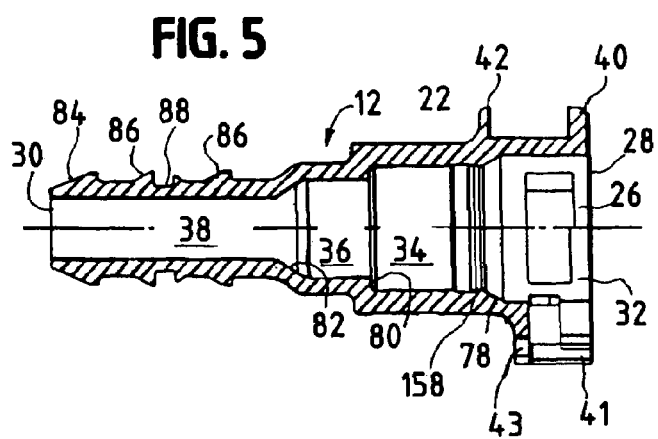
FIG. 5 is a sectional view of the connector body of FIG. 4, taken through line 5-5.
Figure 6:
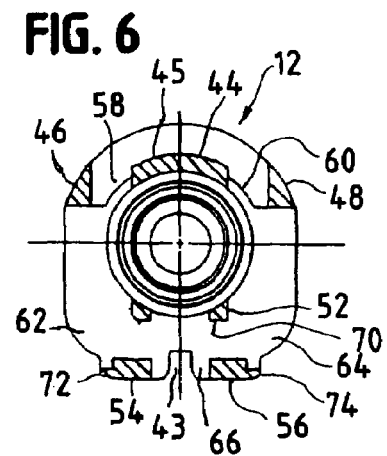
FIG. 6 is a sectional view of the connector body of FIG. 3, taken through line 6-6.
Figure 7:
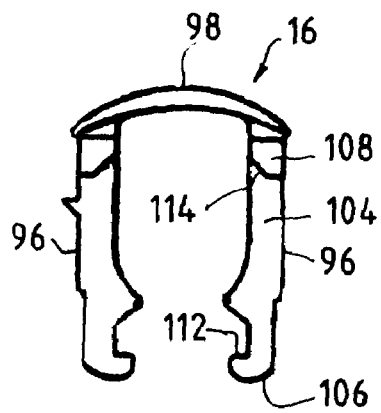
FIG. 7 is a front view of the primary retainer of FIG. 1.
Figure 8:
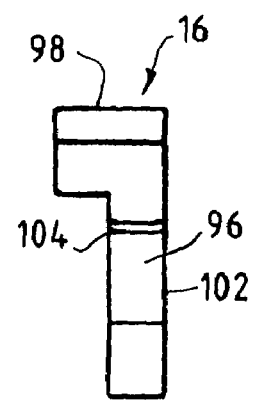
FIG. 8 is a side view of the primary retainer of FIG. 7.
Figure 9:
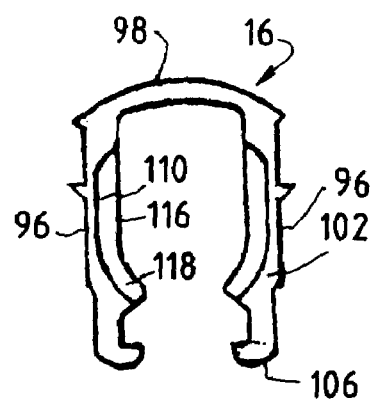
FIG. 9 is a rear view of the primary retainer of FIG. 5.
Figure 10:
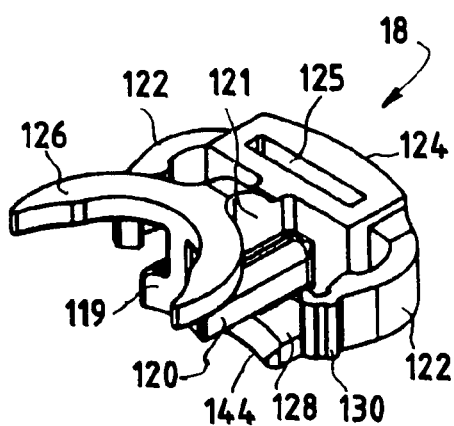
FIG. 10 is a perspective view of the secondary latch/verifier of FIG. 1.
Figure 11:
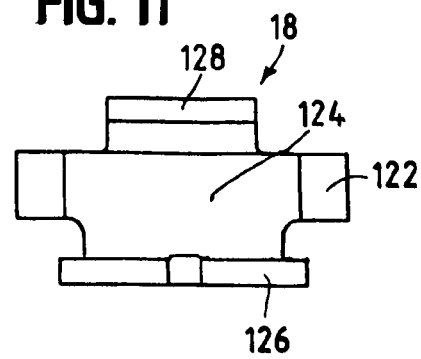
FIG. 11 is a top view of the secondary latch/verifier of FIG. 10.
Figure 12:
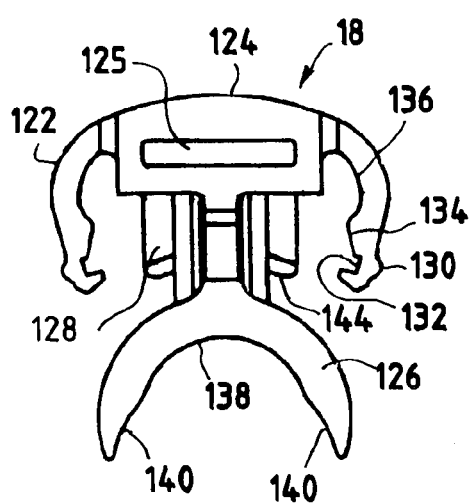
FIG. 12 is a rear view of the secondary latch/verifier of FIG. 10.
Figure 13:
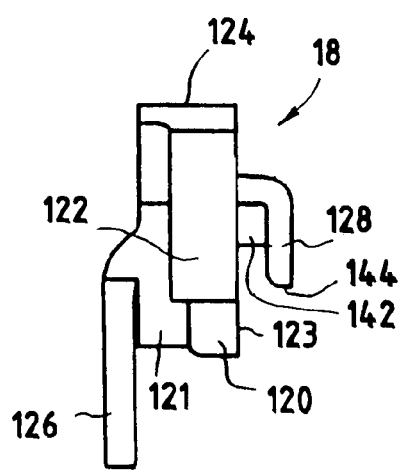
FIG. 13 is a side view of the secondary latch/verifier of FIG. 10.

The primary "horse-shoe" type retainer 16 is illustrated in detail in FIGS. 7-9. It is preferably made of a resilient, flexible material, such as plastic. The primary retainer 16, which extends through the top slots 58,60 of retainer housing section 32, is demountably coupled to the connector body 12.

The primary retainer 16 includes a pair of elongated, generally parallel legs 96 extending from, and joined at one end by, a cross member 98. The cross member 98 provides a separation between the legs 96 approximately equal to the non-upset outer diameter of the male member 14. The legs 96 have an axial width approximately equal to, but slightly less than (to allow clearance), the axial width of the top slots 58,60. The lateral width of the legs 96 is significantly less than the lateral width of the top slots 58,60, in order to allow outward expansion of the legs 96 (to permit male member insertion and release).

The cross member 98 has an axial width substantially greater than that of the legs 96. As illustrated in FIG. 8, the cross member 98 is axially aligned with the front faces 102 of the legs 96, but extends axially beyond the rear faces 104 of the legs 96.

Each leg 96 includes a latch 106 formed at an end remote from the cross member 98, a release protrusion 108 formed on the rear face 104 at an end adjacent to the cross member 98, and a sloping lead area 110 formed on the front face 102 between the latch 106 and the cross member 98. When the primary retainer 16 is fully inserted into the connector body 12, the latches 106 lock the primary retainer 16 into position relative to the connector body 12. Latching edges 112, defined by the latches 106, engage the locking shoulders 68,70, defined by the center support members 50,52 of the connector body 12, to lock the primary retainer 16 in place.

The release protrusions 108 protrude from the rear face 104 of each leg 96, just below the cross member 98. The release protrusions 108 extend axially from the legs 96 a distance approximately equal to the distance by which cross member 98 extends axially from the legs 96. Ramped or camming surfaces 114 are formed on each protrusion 108. When assembled, the ramped surfaces 114 rest just above the curved upper surface 45 of the top support member 44 of the connector body 12. If pressure is applied to the cross member 98 to press the primary retainer 16 further into the connector body 12, the ramped surfaces 114 contact and slide or cam against the top support member 44. Consequently, the legs 96 spread apart, allowing release of the male member 14.

The lead areas 110 slope radially and axially inward from the front face 102 of each leg, and terminate approximately midway between the front face 102 and the rear face 104. The spacing between the lead areas 110 is at its greatest adjacent the front face 102. Here, the spacing is approximately equal to the diameter of the upset 90 formed on the male member 14. At the rear edges 116 of the lead areas 110, the spacing between the lead areas 110 is approximately equal to the (non-upset) outer diameter of the male member 14. The portions of the lead areas 110 closer to the latches 106 curve inwardly at 118 to match the annular profile of the male member upset 90. This assists in guidance and centering of the male member 14 through the connector body 12.

The secondary latch/verifier 18 is illustrated in detail in FIGS. 10-13. It is preferably made of a resilient, flexible material, such as plastic. The secondary latch/verifier 18 includes a retainer beam 119, and a pair of elongated, generally parallel fingers 122 joined by a connecting member 124. The connector member 124 defines a rectangular shaped notch 125. The notch 125 is shaped to allow a knifed edge having a rectangular shaped cross-section, such as the end of a screw driver, to be inserted therein to provide the leverage necessary to pry the secondary latch/verifier 18 from the latched position (as illustrated in FIG. 17) to the non-latched position (as illustrated in FIG. 16.) Extending axially from the front of the retainer beam 119 is a tube verifier 126. Extending axially from the rear of the connecting member is a retaining rim 128.

The retainer beam 119 includes a laterally enlarged portion 120 and a narrowed portion 121. The lateral width of the enlarged portion 120 is slightly less than the lateral width of the bottom slot 66. The lateral width of the narrowed portion 121 is slightly less than the lateral width of the outer rim slot 41. The enlarged portion 120 defines an abutment surface 123 for abutment with the upset 90 of the male member 14. The radially inner surface of the retainer beam 119 is curved to match the curvature of the outer surface of the tube forming the male member 14.

Each finger 122 includes a hook 130 formed at an end remote from the connecting member 124. Notches 132, defined by the hooks 130, engage the locking ridges 72,74, defined by the bottom support members 54,56 to secure the secondary latch/verifier 18 to the connector body 12 when the secondary latch/verifier is in an unlatched positioned. Located between the hooks 130 and the connecting member 124, the inner surface of each finger 122 defines a ramped surface 134 and a laterally enlarged surface 136. The distance between the ramped surfaces 134 of the two fingers is smaller than the distance between the locking ridges 72,74. The distance between the laterally enlarged surfaces 136 of the two fingers is approximately equal to the distance between the locking ridges 72,74. Furthermore, the narrowest distance between the inner surfaces of the fingers 122 is slightly greater than the distance between the outer surfaces of the legs 96 of the primary retainer 16. The axial width of the fingers 122 is approximately equal to the axial width of the legs 96.

The tube verifier 126 is generally moon shaped. The radially inner surface of the tube verifier 126 has a first curved surface 138 and a second curved surface 140. The first curved surface 138 is curved to match to curvature of the outer surface of the tube forming the male member 14. The second curved surface 140 is curved to match the curvature of the outer surface of the upset 90.

The retaining rim 128 extends axially from the rear of the connecting member 124. A rib 142 connects the front surface of the retaining rim 28 to the rear surface of the connecting member 124. The lateral width of the rib 142 is slightly smaller than the lateral width of the notch 43 of the inner rim 42. The axial length of the rib 142 is slight larger than the axial thickness of the inner rim 42. An edge 144 is defined at the radially inward edge of the retaining rim 128. The curvature of the edge 144 matches the curvature of the portion of the exterior wall 20 surrounding the seal chamber 34. The curvature of the edge 144 is curved to allow upward pressure to release secondary latch/verifier into unlatch position and servicing of male member.

As illustrated in FIG. 14, disposed within the seal chamber 34 are two O-ring seals 146,148 separated by a rigid spacer ring 150. The O-rings 146,148 are sized to fit tightly within the seal chamber 34 and tightly around the sealing surface 94 of the male member 14. The O-rings 146,148 are secured in the seal chamber 34 by a hollow spacer sleeve 152. The spacer sleeve 152 has a conically enlarged end 154 which seats against the conical shoulder 78 of interior wall 22 to position the sleeve 152 within bore 26. To provide enhanced securement of the spacer sleeve 152 within the bore 26, a raised annular portion 156 is formed in the outer periphery of sleeve 152, and a corresponding annular recess 158 is formed in the interior wall 22 (see FIG. 5). The raised portion 156 would be matingly received in the recess 158 formed in the interior wall 22 to lock the sleeve 152 into place.

Prior to inserting the male member 14 into the connector body 12, the primary retainer 16 is first attached to the connector body 12. The legs 96 of the primary retainer 16 are inserted through the top slots 58,60 of the retainer housing section 32. The primary retainer 16 is oriented such that the cross member 98 and the release protrusions 108 are located above the top support member 44, and the lead areas 110 of the legs 96 face the male member reception end 28.

Insertion of the legs 96 through the top slots 58,60 is facilitated by applying a downward force on the cross member 98. "Downward force" as defined in this patent application is a force that is applied toward the connector body 12. An increase in downward force is necessary when the legs 96 contact the sides of center support members 50,52. Applying sufficient downward force, the rounded ends of the legs 96 slide against the sides of the center support members 50,52, spreading the legs 96 apart and allowing the legs 96 to pass by the center support members 50,52. When the legs clear the center support members 50,52, the legs 96 spring inward with the latching edges 112 positioned under the locking shoulders 68,70 of the bottom support 78 to secure the primary retainer 16 to connector body 12. A properly attached primary retainer 16 is illustrated in FIGS. 15-17. In the attached position, the legs 96 of the primary retainer 16 are approximately perpendicular to the axis 24 of the bore 26 when viewed from the side (see FIGS. 1 and 15). When viewed from the front or the rear, the legs 96 are approximately equally spaced from the axis 24 of the bore 26 (see FIGS. 16 and 17).

With the primary retainer 16 properly attached to the connector body 12, the male member 14 is then inserted into the connector body 12. The sealing surface 94 of the male member 14 passes between legs 96 and into seal chamber 34 with little or no resistance, as the spacing between the legs 96 is approximately equal to the non-upset outer diameter of the male member 14. Resistance to insertion occurs when the upset 90 of the male member 14 contacts the legs 96. The lead areas 110 of the legs 96 permit passage of the upset 90 between the legs upon applying sufficient axial inward force. As the upset 90 passes between legs 96, it rides along the lead areas 110 and flexes the legs 96 radially outward. Once the upset 90 has passed the legs, the legs 96 spring back into place behind the upset 90 to a locked position. The rear faces 104 of the legs 96 abut the upset to prevent subsequent inadvertent withdrawal of the male member 14 from the connector body 12. The spacer sleeve 152, along with the conical shoulder 78 defined on the interior wall 22 of the connector body 12, prevents further inward insertion of male member 130 from the locked position.

Release of the male member 14 from a locked position can be achieved by exerting a downward force on the cross member 98. Downward force on the cross member 98 causes the release protrusions 108 to contact the curved upper surface 45 of the top support member 44 of connector body 12. The ramped surfaces 114 of the release protrusions 108 slide or cam against the top support member 44, causing the legs 96 to spread laterally apart as application of downward force continues. Eventually, the legs 96 will be spread apart a distance sufficient to allow passage of the upset 90 between the legs 96. The male member 14 may then be withdrawn from the connector body 12. Upon withdrawal of the member 14 from the connector body 12 and relaxation of primary retainer 16, the primary retainer 16 reassumes to its normal installed position.

The coupling is completed by positioning the secondary latch/verifier 18 from a non-latched position, in which the locking ridges 72,74 are located within the notches 132, (as illustrated by FIGS. 15 and 16) to a latched position (as illustrated by FIG. 17). To position the secondary latch/verifier 18 to the latched position, a downward force is applied to the connecting member 124. With sufficient downward force, the ramped surfaces 134 of the fingers 122 slide against the sides of the locking ridges 72,74, spreading the fingers 122 apart and allowing the fingers to pass by the bottom support members 54,56. With the male member 14 properly inserted in the connector body 12, as illustrated in FIGS. 16 and 17, the secondary latch/verifier is able to move to a position where a section of the fingers 122 of the secondary latch/verifier 18 are located laterally outward of the legs 96 of the primary retainer 16. At the same time, the retainer beam 119 and the tube verifier 126 are moved radially inward toward the male member 14, and the retaining rim 128 is moved radially inward toward the exterior wall 20 surrounding the seal chamber 34.

When the secondary latch/verifier 18 is fully inserted into the connector body 12, the locking ridges 72,74 surpass the ramped surfaces 134 of the fingers 122 and are situated between the laterally enlarged surfaces 136. The fingers 122 of the secondary latch/verifier 18 spring laterally inward to the latched position as illustrated in FIG. 17. The fingers 122 of the secondary latch/verifier 18 are approximately perpendicular to the axis 24 of the bore 26 when viewed from the side (see FIGS. 1 and 15). When viewed from the front or the rear, the fingers 122 are approximately equally spaced from the axis 24 of the bore 26 (see FIGS. 16 and 17). In the latched position, a portion of each finger 122 of the secondary latch/verifier 18 is positioned laterally outward of the corresponding leg 96 of the primary retainer 16. The position of the fingers 122 relative to the legs 96 prevents the legs 96 from inadvertently moving laterally outward to release the male member 14 from the locked position. In the latched position, the rear surface of the retainer beam 119 is in axial abutting relationship with the upset 90 of the male member 14. This axial abutting relationship between the retainer beam 119 and the upset 90 provides the secondary latch/verifier 18 with the secondary latch feature to retain the male member 14 in the connector body 12 should the primary retainer 16 fail.

The retaining rim 128 and the tube verifier 126 serve to position the secondary latch/verifier 18 to the connector body 12. In the latched position, the rib 142 extends through the notch 43 defined on the bottom of the inner rim 42. The retaining rim 128 is situated immediately axially rearward of the inner rim 42 of the connector body 12 and immediately radially outward of the exterior wall 20 surrounding the seal chamber 34. The connecting member 124 is situated immediately axially forward of the inner rim 42. The retaining rim 128 and the connecting member 124 of the secondary latch/verifier 18 sandwich the inner rim 42 to axially position the secondary latch/verifier 18 relative to the connector body 12. The narrowed portion 121 of the retainer beam 119 extends through the outer rim slot 41. The tube verifier 126 is situated immediately forward of the outer rim 40 of the connector body 12 and immediately radially outward of the tube forming the male member 14. Since the retaining rim 128 is situated immediately radially outward of the connector body 12 and the tube verifier 126 is situated immediately radially outward of the tube, the retaining rim 128 and the tube verifier 126 prevents the secondary latch/verifier 18 from tilting once it is in the latched position.

FIG. 18 illustrates a situation when the male member 14 was not properly inserted into the connector body 12. In such a situation, the male member 14 has not been sufficiently inserted into the connector body 12 for the upset 90 to surpass the legs 96 of the primary retainer 16. With the legs 96 still spread apart, the fingers 122 of the secondary latch/verifier 18 are unable to be inserted radially inward into the connector body 12 since the ends of the fingers 122 will abut the still spread apart legs 96 of the primary retainer 16. Furthermore, with the male member 14 insufficiently inserted into the connector body 12, the upset 90 is located immediately radially inward of the retainer beam 119 of the secondary latch/verifier 18. Abutment of the radially inwardly surface of the retainer beam 119 with the radially outer surface of the upset 90 also prevents the secondary latch/verifier from being able to be inserted radially inward into the connector body 12. This inability of the secondary latch/verifier 18 from moving radially inward to the latched position provides verification to the user that the male member 14 has not been sufficiently inserted into the connector body 12. On the other hand, if the male member 14 has been sufficiently inserted into the connector body 12, such that the upset 90 has surpassed the legs 96 of the primary retainer 16, the ends of the fingers 122 of the secondary latch/verifier will not abut the legs 96 of the primary retainer 16 and the radially inwardly surface of the retainer verifier 119 will not abut the radially outer surface of the upset 90 allowing the secondary latch/verifier 18 to move to the latched position. This ability of the secondary latch/verifier 18 to move radially inward to the latched position provides verification to the user that the male member 14 has been sufficiently inserted into connector body 12.

FIGS. 19-30 disclose a quick connector coupling illustrative of features of the present invention including a feature not present in the coupling of FIGS. 1-18. The components are also slightly modified as described below but essentially provide the advantages of the first illustrated embodiment.

The additional feature of this embodiment is that the quick connect coupling can be shipped and installed into a fluid line in a fully assembled and final latched condition. All retention and latch components are in place within the connector body as they would be to secure the male member within the connector body. This feature is significant in that the coupling of a rigid tube to the connector body is attainable with the secondary latch verifier connected to the connector body and positioned in the final latched position.

Turning now to FIGS. 19-30, FIG. 19 illustrates a quick connector coupling for forming a severable connection in a fluid line. The coupling is comprised of a generally cylindrical female connector body 712 and a male member 714 releasably secured together by a primary retainer member 716 and separate a secondary latch/verifier member 718. The male member 714 is formed at an end of a hollow tube which forms a part of a fluid line system. In use, the female connector body 712 is connected to a tubing or hose 13 (as illustrated in FIG. 14) which is also a part of the fluid line system. The female connector body 712 and the male member 714 are connectable to form a permanent, but severable, joint in the fluid line.

Figure 22:
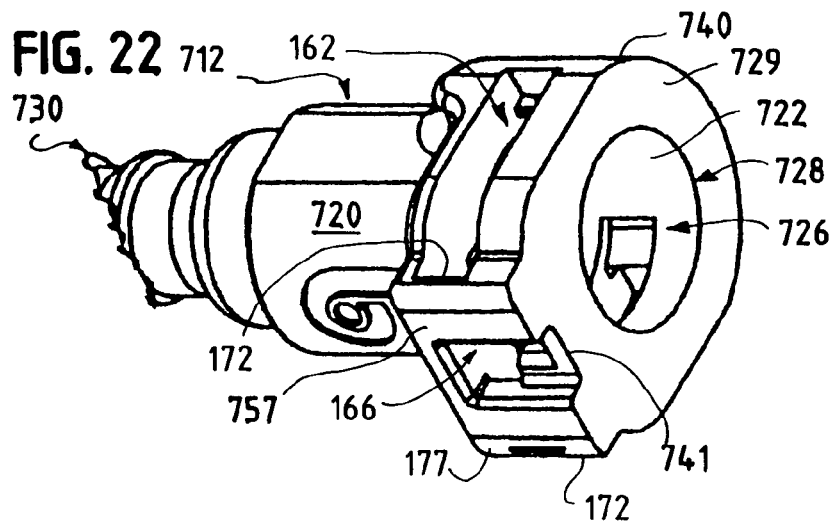
FIG. 22 is a perspective view of the connector body of the quick connector coupling of FIG. 19.
Figure 23:
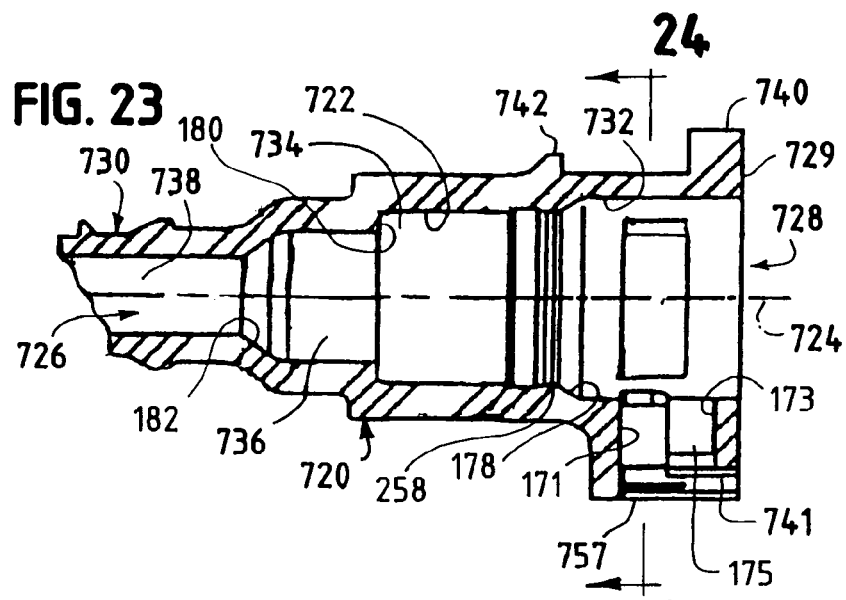
FIG. 23 is a sectional side view of the connector body of the quick connector coupling of FIG. 19.
Figure 24:
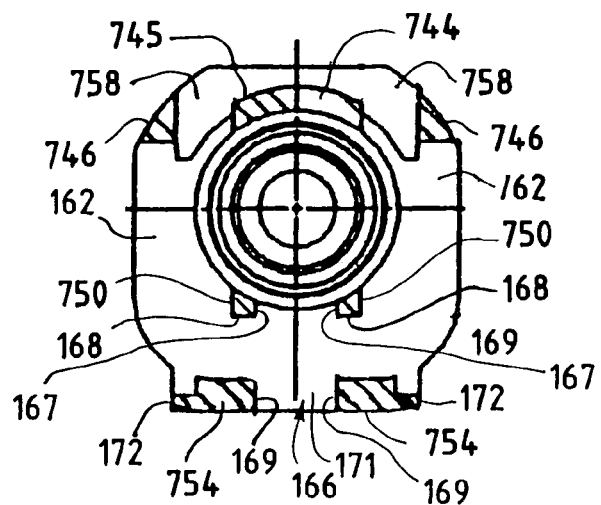
FIG. 24 is a sectional plan view of the connector body of FIG. 23 taken along line 24-24 of that figure.

The connector body 712 is illustrated in detail in FIGS. 22-24. The connector body 712 is defined by a generally cylindrical, stepped exterior wall 720 and a generally cylindrical, stepped interior wall 722. The illustrated connector body 712 is preferably molded of a plastic material, such as polyamide. It must be understood that the body exterior may take any desired shape without departing from the invention. It could, for example, include a 90° bend between its ends, which is a common shape for a connector body.

The interior wall 722 defines a through bore 726 centered about a longitudinal axis 724. It should be noted that the term axial as used herein means along the central axis 724. The terms lateral, laterally, transverse and transversely mean side-to-side in a plane generally perpendicular to the axis 724. Transverse movement means movement toward and away from the axis 724 generally in a plane perpendicular to the axis 724. Lateral movement means side-to-side movement toward and away from the axis 724 in a plane generally perpendicular to the axis 724. The bore 726 of connector body 712 extends completely through the connector body 712, from a larger diameter, male member reception end 728 to a smaller diameter, hose connection end 730.

Variations in the diameter of interior wall 722 of connector body 712 divide through bore 726 into distinct sections. Moving axially inward from the male member reception end 728 to the hose connector end 730, they are: retainer housing section 732, seal chamber 734, tube end receptacle 736, and fluid passageway 738.

The retainer housing section 732 is adjacent to the male member reception end 728. It is defined by an axially outer rim 740 having a transverse planar rearward facing surface 729 that defines the entrance to through bore 726 at the male reception end 728. As seen in FIG. 24, axially outer rim 740 is connected to an axially inner rim 742 by a top support member 744, two side support members 746, two center support members 750, and two bottom support members 754. A bottom wall 757 extends between rims 740 and 742 at bottom support members 754. A notch 741 is defined at the bottom wall 757 at the axially outer rim 740.

The spaces between the top support member 748 and the two side support members 746 define a pair of first, or top slots 758. The space intermediate the two center support members 750 and the two bottom support members 754 defines a second or bottom slot 166 directly opposite from top support member 744. These slots are open to the through bore 726. The spaces between the two side support members 746 and bottom support members 754 define a pair of third or side slots 162.

The top slots 758 receive and position the primary retainer 716 transversely to the central axis 724 of the connector body 712. The bottom slot 166 receives and positions the secondary latch/verifier 718 transversely to central axis 724 of the connector body. Elements of both the primary retainer 716 and secondary latch/verifier 718 reside in side slots 162 as is readily understood.

The bottom slot 166 includes an enlarged portion that extends laterally between spaced surfaces 167 of center support members 750 and spaced surfaces 169 of bottom support members 754 as seen in FIGS. 22-24 and a narrowed portion, best seen in FIGS. 22 and 23 that extends transversely between lateral surfaces 175 one of which is seen in FIG. 23 The surfaces 175 extend between notch 741 and internal bore 726 and are parallel to each other generally equidistant from center line or central axis 724.

The cross section of the bottom slot is generally "T" shaped. Inner wall surface 171 of the bottom slot 166 defines the innermost surface of the bottom slot 166. A front or outer wall surface 173 defines the forward or front wall of bottom slot 166 as seen in FIG. 23. Retainer housing section 732 also defines a tube upset receiving chamber within through bore 724 axially inward of the wall surface 171 of the retainer housing section 732.

The top support member 744 defines a curved upper surface 745. Each of the center support members 750 defines a locking shoulder 168. A locking ridge 172 extends laterally from the outer edge of each bottom support member 754.

The seal chamber 734 is formed axially inward of the retainer housing section 732. It is defined by a reduced diameter portion of interior wall 722, relative to the retainer housing section 732, extending axially inward from a conical shoulder 178 to a radial shoulder 180. The seal chamber 734 is provided to house sealing elements to form a fluid seal between the connector body 712 and the male member 714 as described in connection with the embodiment of FIGS. 1-18.

The tube end receptacle 736 is formed axially inward of the seal chamber 734. It is defined by a reduced diameter portion of interior wall 722, relative to seal chamber 734, which extends axially inward from the small diameter end of radial shoulder 180 to a conical shoulder 182. The tube end receptacle 736 is sized to receive, and pilot or guide the male member 714.

The fluid passageway 738 is defined by the smallest diameter portion of interior wall 722. It leads from the small diameter end of conical shoulder 182 to hose connection end 730. The portion of exterior wall 720 surrounding fluid passageway 738 is configured to facilitate connection to another component in the fluid line. The illustrated connector body 712 for example, is specially formed for connection to a flexible hose as in the embodiment of FIGS. 1-18. Of course, as previously discussed, any other suitable connection arrangement can be used.

Figure 19:
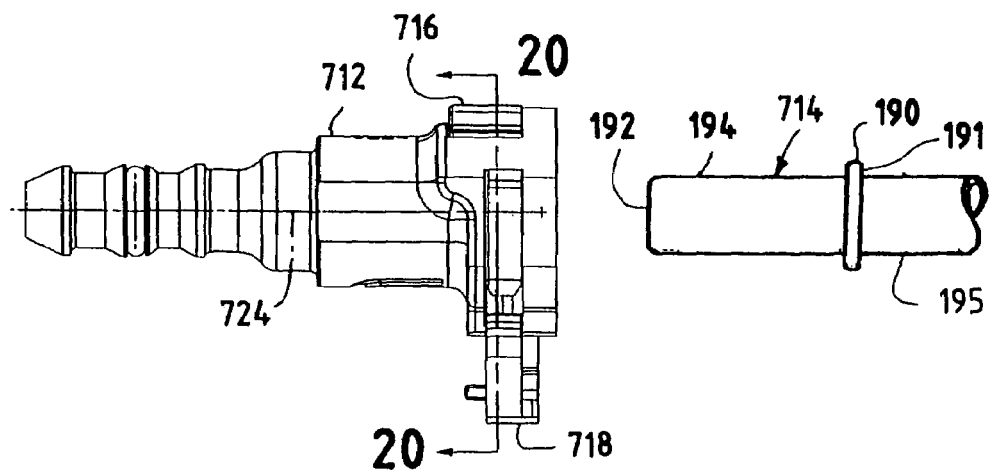
FIG. 19 is a plan view of another quick connector coupling arrangement embodying the features of the present invention and possessing additional capability as compared to the quick connector coupling of the embodiment of FIGS. 1-18.

As illustrated in FIG. 19, the male member 714 is formed at the end of a rigid tube. It includes a radially enlarged upset 190 defining a radial abutment surface 191 at a given distance from an open tube end or tip 192. The tube end or tip 192 can be rounded or tapered to make insertion of the male member 714 into the connector body 712 less difficult. A smooth, cylindrical sealing surface 194 extends between the upset 190 and the tube end 192. The outer diameter of sealing surface 194 should be such that the end of male member 714 fits snugly within the tube end receptacle 736. The tube continues in a direction away from tube end beyond upset 190 and defines a generally smooth cylindrical surface 195. It is generally the same diameter as the cylindrical sealing surface 194.

Figure 25:
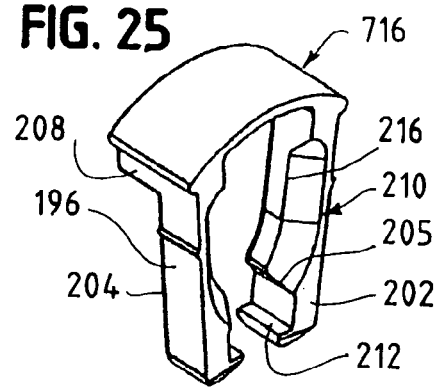
FIG. 25 is a perspective view of the primary retainer of the quick connector coupling of FIG. 19.
Figure 26:
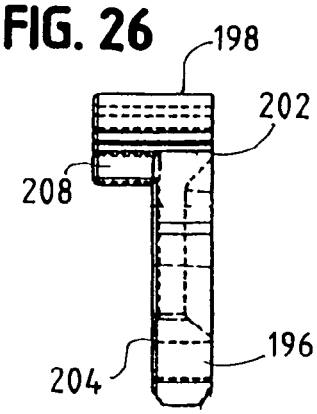
FIG. 26 is a side view of the primary retainer of the quick connector coupling of FIG. 19.
Figure 27:
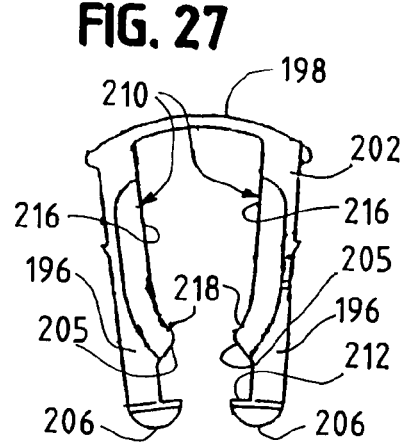
FIG. 27 is a plan view of the primary retainer of the quick connector coupling of FIG. 19.

The primary "horse-shoe" type retainer 716 is illustrated in detail in FIGS. 25-27. It is preferably molded of a resilient, flexible material, such as plastic. The primary retainer 716, which extends through the top slots 758 of retainer housing section 732, is demountably coupled to the connector body 712.

The primary retainer 716 includes a pair of elongated, generally parallel legs 196 extending from, and joined at one end by, a cross member 198. The cross member 198 provides a separation between the legs 196 approximately equal to the non-upset outer diameter of the male member 714. The legs 196 have an axial width approximately equal to, but slightly less than (to allow clearance), the axial width of the top slots 758. The lateral width of the legs 196 is significantly less than the lateral width of the top slots 758, in order to allow outward expansion of the legs 196 (to permit male member insertion and release).

The cross member 198 has an axial width substantially greater than that of the legs 196. As illustrated in FIG. 26, the cross member 198 is axially aligned with outer faces 202 of the legs 196, but extends axially beyond inner faces 204 of the legs 196.

Each leg 196 includes a latch 206 formed at an end remote from the cross member 198. When the primary retainer 716 is fully inserted into the connector body 712, the latches 206 lock the primary retainer 716 into position relative to the connector body 712. Latching edges 212, defined by the latches 206, engage the locking shoulders 168, defined by the center support members 750 of the connector body 712, to releasably lock the primary retainer 716 in place. Each leg 196 includes an angled surface 205 seen in FIG. 27 that coacts with upper lateral outward edges of center support members 750 to urge the primary retainer upward. The resilient property of the legs 196 assures this relationship.

Release protrusions 208 protrude from the inner face 204 of each leg 196, just below the cross member 198. The release protrusions 208 extend axially from the legs 196 a distance approximately equal to the distance by which cross member 198 extends axially from the legs 196. Ramped or camming surfaces, such as the ramped or camming surfaces of the primary retainer 16 of the embodiment of FIGS. 1-18 are formed on each protrusion 208. When assembled, the ramped surfaces rest just above the curved upper surface 745 of the top support member 744 of the connector body 712. If pressure is applied to the cross member 198 to press the primary retainer 716 further into the connector body 712, the ramped surfaces contact and slide or cam against the top support member 744. Consequently, the legs 196 spread apart, with the latches moving transversely outward within side slots 162 allowing release of the male member 714.

Lead areas 210 are formed into the forward faces 202 of legs 196. These areas slope radially and axially inward from the front face 202 of each leg, and terminate approximately midway between the outer face 202 and the inner face 204 of each leg. The spacing between the lead areas 210 is at its greatest adjacent the outer face 202. Here, the spacing is approximately equal to the diameter of the upset 190 formed on the male member 714. At the inner edges 216 of the lead areas 210, the spacing between the lead areas 210 is approximately equal to the (non-upset) outer diameter of the male member 714. The portions of the lead areas 210 closer to the latches 206 curve inwardly at 218 to match the annular profile of the male member upset 190. This shape assists in guidance and centering of the male member 714 through the connector body 712.

With the male member 714 fully inserted into the connector body 718, the tube upset 191 resides in the upset receiving chamber inward of transverse inner wall 171. The legs 196 of primary retainer 716 are disposed such that the inner surfaces 204 are in abutting relation to the radial surface 191 of upset 190 and preclude axial movement of the male member 714 outward of the male reception end 728.

Figure 28:
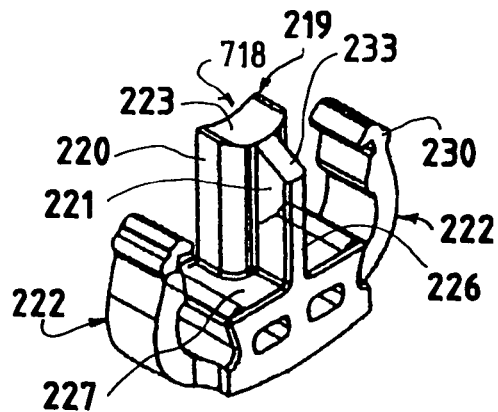
FIG. 28 is a perspective view of the secondary latch/verifier of the quick connector coupling of FIG. 19.
Figure 29:
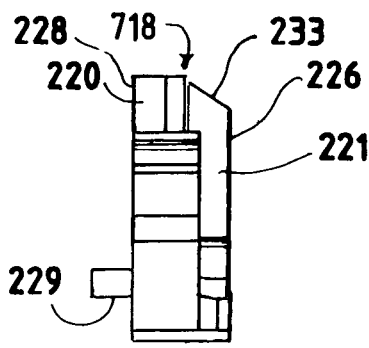
FIG. 29 is a side view of the secondary latch/verifier of the quick connect or coupling of FIG. 19.
Figure 30:
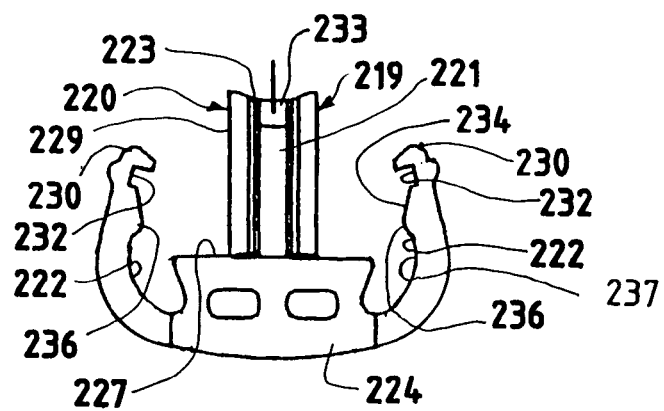
FIG. 30 is a plan view of the secondary latch/verifier of the quick connect or coupling of FIG. 19.
Figure 31:
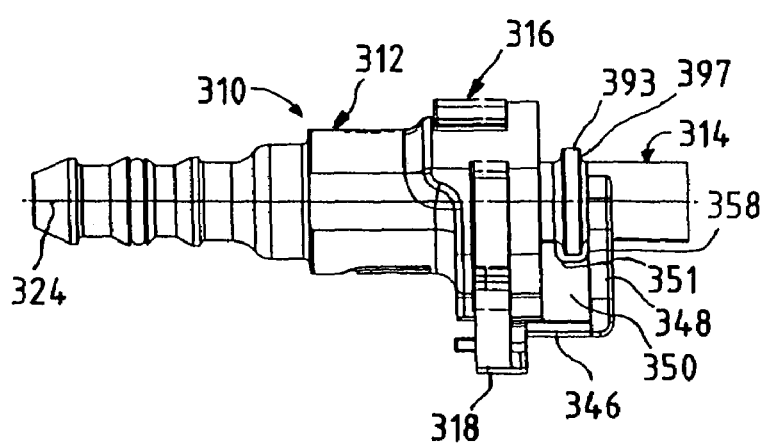
FIG. 31 is a side view of a modified form of quick connector coupling embodying principles of the present invention.
Figure 32:
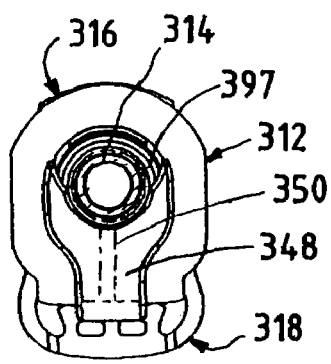
FIG. 32 is an end view of the quick connector coupling of FIG. 31.

The secondary latch/verifier 718 is illustrated in detail in FIGS. 28-30. It extends into bottom slot 166 and also side slots 162 and is demountably coupled to the connector body 712. It is slidable transversely of the connector body 712 relative to bottom support members 756 toward and away from curved top support member 744 and consequently the primary retainer 716 between an inner, or latched, position and an outer, or unlatched, position. It is preferably molded of a resilient, flexible material, such as plastic.

The secondary latch/verifier 718 includes a connecting member 224 with a radially inward facing surface 227 overlying bottom slot 166, and from which extends retainer beam 219 slidably disposed in bottom slot 166. Secondary latch/verifier 218 also includes lateral portions in the form of a pair of curved generally resilient fingers 222 extending laterally from connecting member 224 and inwardly in the same direction as retainer beam 219. Extending axially inward from the inner laterally extending wall of the connecting member is a flange 229. When the secondary latch/verifier 218 is in the latched position flange 229 overlies bottom wall 757 in relatively close proximity. Flange 229 is therefore useful to move the secondary latch/verifier from its latched position by insertion of a screwdriver blade or other instrument between the flange 229 and bottom wall 757 to urge the secondary latch/verifier 218 to the unlatched position.

Each finger 222 includes a hook 230 formed at an end remote from the connecting member 224. Notches 232, defined by the hooks 224, engage the locking ridges 172 defined by the bottom support members 754 to releasably secure the secondary latch/verifier 218 to the connector body 212 when the secondary latch/verifier is in its outer, or unlatched, positioned.

Located between the hooks 230 and the connecting member 224, the inner surface of each finger 222 defines a transition surface in the form of a ramped surface 234 and a laterally enlarged surface 236, and retention lands 237. The distance between the ramped surfaces 234 of the two fingers 222 is smaller than the distance between the locking ridges 172. The distance between the laterally enlarged surfaces 236 is less than the spacing between the lateral outer edges of locking ridges 172. The distance between the retention lands 237 of the two fingers is approximately equal to the distance between the locking ridges 172.

The secondary latch/verifier 718 is moved to its inner, or latched, position transversely toward the primary retainer 716 by asserting a downward (toward the connector body) force on connecting member 224. Such a force urges the locking ridges 172 out of notches 232. Ramped surface 234 ride upon locking ridges 172 and flex the fingers 222 outward causing them to spread apart and permit the enlarged surfaces 236 to pass the locking ridges 172 which then are caused to reside between retention lands 237. The secondary latch/verifier 718 is then releasably retained in that position by the resilient nature of the fingers 222 and the coaction of the retention lands 237 with the locking ridges 172. When so positioned that secondary latch/verifier is in its "down" or "latched" position. It may be dislodged and moved to its unlatched position as previously discussed by inserting a screwdriver blade between flange 229 and bottom wall 757 and forcing the secondary latch/verifier 278 outward of connector body 212.

Figure 21:
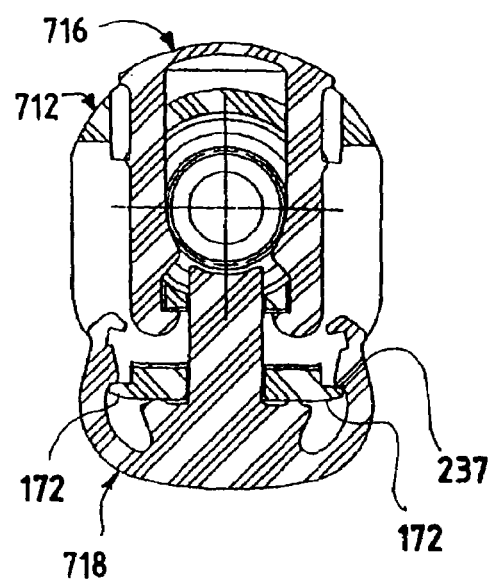
FIG. 21 is a sectional plan view of the quick connector coupling of FIG. 19 taken along the line 20-20 of FIG. 19 illustrating the coupling components in a different relationship during completion of connection to a fluid line.

With the secondary latch/verifier 718 in its latched position, as best seen in FIG. 21. The hooks 230 at the free ends of fingers 222 are positioned in the side slots 162, laterally outward of the latches 206 at the free ends of legs 196. The distance between the inner surfaces of the hooks 230 on fingers 222 is slightly greater than the distance between the outer surfaces of the legs 196 of the primary retainer 716 at latches 206. The axial width of the fingers 222 is approximately equal to the axial width of the legs 196. Notably, the length of the fingers 222 is such that when the secondary latch/verifier 218 is in the latched position, the fingers 222 interfere with outward flexing of the legs 196 thus assuring that the fingers 196 remain locked to locking shoulders 168 of center support members 750.

The retainer beam 279 includes a laterally enlarged portion 220 and a narrowed portion 221. The lateral width of the enlarged portion 220 is slightly less than the lateral width of the enlarged portion of the bottom slot 166 between spaced wall surfaces 167 on center support members 750 and spaced wall surfaces 169 on bottom support members 754. The lateral width of the narrowed portion 221 is slightly less than the lateral width of the narrowed portion of bottom slot 166 between laterally spaced walls 175.

Figure 20:
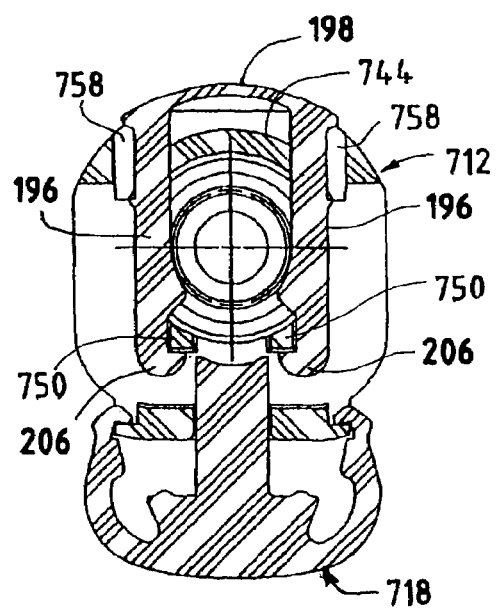
FIG. 20 is a sectional plan view of the quick connect coupling of FIG. 19 taken along the line 20-20 of FIG. 19 illustrating the coupling components in a particular relationship during completion of a connection to a fluid line.

As best seen in FIG. 28, cross-section of the retainer beam 219 is "T" shaped. The narrowed portion 221 forms the leg of the "T" and the enlarged portion 220 forms the top cross bar of the "T." The retainer beam 219 includes an inner or rear wall surface 228 on the enlarged portion 220 that faces inner wall 171 of bottom slot 166 of connector body 712. The retainer beam narrowed portion 169 includes an outer or front wall surface 226 that faces front wall 173 of bottom slot 166 of connector body 712. The retainer beam 219 includes lateral side walls of enlarged portion 220 that are closely spaced and slidable relative to wall surfaces 169 of bottom support members 754 and wall surfaces 167 on center support members 750. As best seen in FIGS. 20 and 21, the narrowed portion 221 of retainer beam 219 includes lateral side walls that are closely spaced and slidable relative to the lateral walls 175 of the narrowed portion of bottom slot 166.

As described above, the retainer beam 219 of secondary latch/verifier 718 is therefore slidably received and supported in bottom slot 166 of connector body 712. The walls of the bottom slot 166, therefore, slidably support the retainer beam 219 and consequently the secondary latch/verifier 718 in the bottom slot for movement of the secondary latch/verifier 718 between its unlatched and latched positions. The retainer beam is of a length that is exposed in the through bore 726 when the secondary latch/verifier 718 is in the latched position.

The inner wall surface 228 of enlarged portion 220 of retainer beam 219 defines an abutment surface. The retainer beam 219 is of a length such that the abutment surface 228 is arranged for abutment with the radial surface 191 of upset 190 of the male member 714 when the secondary latch/verifier in the latched position.

The radially inner end of retainer beam 718 defines tube facing surface 223 that is curved to match the curvature of the outer surface 195 of the tube forming the male member 714. When the secondary latch/verifier 718 is in the latched position and the inner wall surface 228 of retainer beam 219 is in abutting relation to radial abutment surface 191 of tube 714, tube facing surface 223 is in closely spaced facing relation to the outer surface 195 of tube 714, rearward of the upset 191.

That is, the upset is disposed in the upset receiving chamber of the connector body 718 axially inward of wall 171 of the retainer section 732 of body 712. The inner abutment surfaces 204 on legs 196 are disposed in abutting relation to the surface 191 of upset 190 to preclude withdrawal of male member 190 from male reception end 728 of body 712. The inner wall surface 228 of the retainer beam is similarly disposed in abutting relation to the radial surface 191 of upset 190 and similarly precludes withdrawal of the male member 714.

As illustrated in FIG. 14, relative to the embodiment of FIGS. 1-18, disposed within the seal chamber 734 are two O-ring seals separated by a rigid spacer ring. The illustration of these components is not separately repeated for the embodiments of FIGS. 19-30 but is equally applicable. As in the first embodiment, the O-rings are sized to fit tightly within the seal chamber 134 and tightly around the sealing surface 194 of the male member 714. The O-rings are secured in the seal chamber 734 by a hollow spacer sleeve. The spacer sleeve has a conically enlarged end which seats against the conical shoulder 178 of interior wall 722 to position the sleeve within bore. A raised annular portion is formed in the outer periphery of sleeve, and a corresponding annular recess 258 is formed in interior wall 722 (see FIG. 23). The raised portion of the spacer sleeve would be matingly received in the recess 258 formed in the interior wall 722 to lock the sleeve into place.

In accordance with the present invention the forward or outward facing surface 226 on narrowed portion 221 of retainer beam 219 includes a chamfer defining by cam or ramp surface 233. When secondary latch/verifier 718 is attached to connector body 712 the cam or ramp surface 233 faces toward the male reception end 128 of connector body 718.

With the secondary latch/verifier 718 in its latched position, the cam surface 233 is positioned to be contacted by upset 190 on insertion of male member 714. The ramped surface is shaped such that force urging the retainer beams radially outward is imparted to retainer beam 219. As the male member is inserted the retainer beam is urged outwardly causing the secondary latch/verifier 718 to move to the unlatched position. The male member 714 may then be fully inserted into the connector body 712. After full insertion of the male member 714 into the connector body the secondary latch/verifier 718 may be pushed radially inward to its latched position, placing the inner surface 228 in abutting contact with the radial surface 191 of upset 190.

In the secondary latch/verifier 718 illustrated, the ramped surface 233 is at an angle of 60° (degrees) to the forward surface 226 of the retainer beam. When the beam is slidably installed into the bottom slot 166, it is positioned generally perpendicularly to the center line or axis 724. Hence, the ramp surface 233 is at about a 30° angle relative to the axis 724 of connector body 712, diverging toward the male reception end 728.

The angle used for the cam surface is not critical. It need only be such that the axial force applied during insertion of the male member 714 be sufficient to cause translation of the secondary latch/verifier 718 from its latched, to its unlatched position.

The assembled quick connector coupling of the embodiment FIGS. 19-30 is best seen in FIGS. 19-21. The primary retainer 716 is attached to the connector body 712. The legs 196 of the primary retainer 716 extend through the top slots 758 of the retainer housing section 732. The primary retainer 716 is oriented such that the cross member 198 and the release protrusions 208 are located above the curved upper surface 745 of top support member 744. The lead areas 210 of the legs 196 face the male member reception end 728.

The primary retainer 716 is attached to connector body 712 by insertion of the legs 196 through the top slots 758 by applying a downward force on the cross member 198. An increase in downward force is necessary when the legs 196 contact the sides of center support members 750. Applying sufficient downward force, the rounded ends of the legs 196 slide against the sides of the center support members 750, spreading the legs 196 apart and allowing the legs 196 to pass beyond the center support members 750. When the latches 206 on legs 196 clear the center support members 750, the legs 196 spring laterally inward with the latching edges 212 positioned under the locking shoulders 168 of the center supports 750 to releasably lock the primary retainer 716 to connector body 712.

A properly attached primary retainer 716 is illustrated in FIGS. 20 and 21. In the attached position, the legs 196 of the primary retainer 716 are approximately perpendicular to the axis 724 of the bore 726 when viewed from the side. When viewed from the front or the rear, the legs 196 are approximately equally spaced from the axis 724 of the bore 726.

The connector assembly is completed by the secondary latch/verifier 718 being positioned within bottom slot 166. In this embodiment, illustrated in FIGS. 19-30, the secondary latch/verifier 718 is releasably positioned, as illustrated in FIG. 21, with the locking ridges 172 located behind retention lands 237. Thus, the secondary latch/verifier is in its inward, or latched, position. Notably, when so positioned, the cam surface 233 of retainer beam 219 faces male member reception end 128 of connector body 712 and is exposed within through bore 726 intermediate the sloping lead areas 210 on legs 196 of primary retainer 716.

With the primary retainer 716 and secondary latch/verifier 718 attached to the connector body 712, the male member 714 may be inserted into the connector body 712 to complete a fluid path. As the male member 714 is inserted, the end or tip 192 of tube 714 contacts each lead sloping surface 210 on legs 196. The sealing surface 194 of the male member 714 passes between legs 196 and into seal chamber 734 with little or no resistance, since the spacing between the legs 196 is approximately equal to the non-upset outer diameter of the male member 714.

Resistance to insertion occurs when the upset 190 of the male member 714 contacts the legs 196. The lead areas 210 of the legs 196 permit passage of the upset 190 between the legs only upon applying sufficient axial inward force. As the upset 190 passes between legs 196, it rides along the lead areas 210 and flexes the legs 196 radially or laterally outward. Once the upset 190 has passed the legs, the legs 196 spring back into place behind the upset 190 to a locked position, latching edges 712 engaged on locking shoulders 168 of center support members. The upset 191 is disposed within the upset receiving chamber defined between wall 171 of retainer housing section 732 and conical shoulder 178 in bore 726. The inner faces 204 of the legs 196 abut the upset radial face 191 to prevent subsequent unintentional withdrawal of the male member 714 from the connector body 712. The spacer sleeve, as shown in the embodiment of FIGS. 1-18, along with the conical shoulder 178 defined on the interior wall 722 of the connector body 712, prevent further inward insertion of male member 714.

Important to the features of the invention, as illustrated in the embodiment of FIGS. 19-30, as the upset 190 contacts sloping lead areas 210 of legs 196 of primary retainer 716, it also comes into contact with cam surface 230 on retainer beam 219 of secondary latch/verifier 718. Continued axial pressure toward insertion of the tube or male member 714 exerts an upward force on the retainer beam 219 away from the connector body 712. The resilient nature of the fingers 222, permits them to spread apart and permits the secondary latch/verifier 718 to slide within the bottom slot 166 from its latched, to its unlatched position. Once the laterally enlarged surfaces 236 pass the locking ridges 172, the ramped surfaces 234 on fingers 222 coact with the outer edges of locking ridges 172 and facilitate transverse outward movement of the secondary latch/verifier.

In the unlatched position the notches 232 on hooks 230 of fingers 222 capture the locking ridges 172 of bottom support members 754. In this position, the curved abutment surface 223 on retainer beam 219 is spaced radially outwardly from axis or center line 724 to permit the passage of tube upset 190.

As previously described the tube upset 190 causes the legs 196 of primary retainer 716 to flex outwardly and permit passage of the upset 190 inwardly in the central bore 726 until further inward movement is prevented by contact of the upset with the internal spacer sleeve such as that illustrated in the embodiment of FIGS. 1-18 and conical shoulder 178 within through bore 726. When so positioned the rear surface 191 of radially enlarged upset 190 is positioned axially inward of the rear faces 204 of elongated legs 196 with the rear faces in abutting relation to radial surface 191 of upset 190. The legs resilient quality causes them to flex inwardly and thus locking the upset 191 inward of the rear faces 204.

With the secondary latch/verifier 718 positioned in the unlatched or up position, release of the male member 714 from a locked position behind legs 196 can be achieved by exerting a downward force on the cross member 198. Downward force on the cross member 198 causes the camming surfaces on release protrusions 208 to contact the curved upper surface 745 of the top support member 744 of connector body 712. The ramped surfaces of the release protrusions 208 slide or cam against the top support member 744, causing the legs 196 to spread laterally apart as application of downward force continues. Eventually, the legs 196 will be spread apart a distance sufficient to allow outward removal of the upset 190 between the legs 196. The male member 714 may thus be withdrawn from the connector body 712. Upon withdrawal of the member 714 from the connector body 712 and relaxation of primary retainer 716, the primary retainer 716 returns to its normal installed position with the cross members 198 urged upwardly by coaction of the angled surfaces 205 against center support members 750.

Referring particularly to FIGS. 20 and 21 implementation of the secondary latch/verifier is illustrated. In both FIGS., the male member 714 is inserted into the through bore 726 axially beyond the inner walls 204 of legs 196. The legs are shown returned to their unflexed position with latching edges 712 captured against locking shoulders 168 of center support members 750. As is understood from the previous description, insertion of the male members 714 as previously described causes secondary latch/verifier 718 to move upward in a direction away from the connector body 712 to the unlatched position illustrated in FIG. 20.

To position the secondary latch/verifier 718 to the latched position, a downward force is applied to the connecting member 224. With sufficient downward force, the ramped surfaces 234 of the fingers 222 slide against the sides of the locking ridges 172, spreading the fingers 222 apart and allowing the fingers to pass radially inward beyond the bottom support members 154. With the male member 714 properly inserted in the connector body 712, as illustrated in FIGS. 20 and 21, the secondary latch/verifier moves to the latched position shown in FIG. 20, where the free ends or hooks 230 of the fingers 222 of the secondary latch/verifier 718 are located laterally outward of the legs 196 of the primary retainer 716. As best seen in FIG. 21, with the secondary latch/verifier 718 in the latched position, hooks 230 are positioned to impede lateral or transverse outward flexing of elongated legs 196 of primary retainer 716. This coaction precludes inward manipulation of cross member 198 to flex legs 196 outward to pull the male member out of the through bore 726.

At the same time, the retainer beam 219 is moved radially inward toward the male member 714. In the latched position, the inner wall 228 of the retainer beam 219 is in axial abutting relationship with the surface 191 of upset 190 of the male member 714. This axial abutting relationship between the retainer beam 219 and the upset 190 also prevents axial movement of male member 714 axially outward of the tube reception end 728 and provides secondary latch feature to retain the male member 714 in the connector body 712.

The particular advantage available with the quick connector coupling arrangement of FIGS. 19-30 is that the connector body 712, primary retainer 716 and secondary latch/verifier 718 can be assembled together and, moreover, the secondary latch/verifier 718 can be placed in the latched position. When the connector body 712 and associated primary retainer 716 and secondary latch/verifier 718 are assembled into a fluid system and a male member 714 inserted, it displaces the secondary latch/verifier to the unlatched position. Once the male member 714 is fully inserted into the through bore 726 and the upset 190 positioned with radial wall 191 inward of the inner abutment surfaces 204 of legs 196, the secondary latch/verifier 718 can be moved to the latched position with the tube facing surface 223 closely spaced to the tube surface 195 and the retainer beam 219 also positioned to impede outward movement of upset 190.

Importantly, as in the embodiment of FIGS. 1-18, should the male member 714 not be fully inserted, the tube facing surface 223 at the free end of retainer beam 219 will contact upset 190 precluding movement of secondary latch/verifier 718 to the latched position. This inability to move the secondary latch/verifier 718 to the latched position will indicate that the male member 714 is not fully inserted and not secured from axial separation by the legs 196 of primary retainer 716.

FIGS. 31-34 illustrate a further modified form of the quick connector coupling of the present invention. In this embodiment a further, externally visible, latching arrangement is added to supplement the features already described in connection with the embodiments of FIGS. 1-30.

Referring particularly to FIGS. 31-34, there is illustrated a quick connector coupling 310 that includes a female connector body 312, that receives a male member 314 in a releasable fluid connection. The connector coupling includes a primary retainer 316 and a secondary latch/verifier 318. These components are configured, and coact as described in connection with the earlier embodiments. However, an additional feature of an externally visible latch/verifier is embodied in this embodiment.

Figure 33:
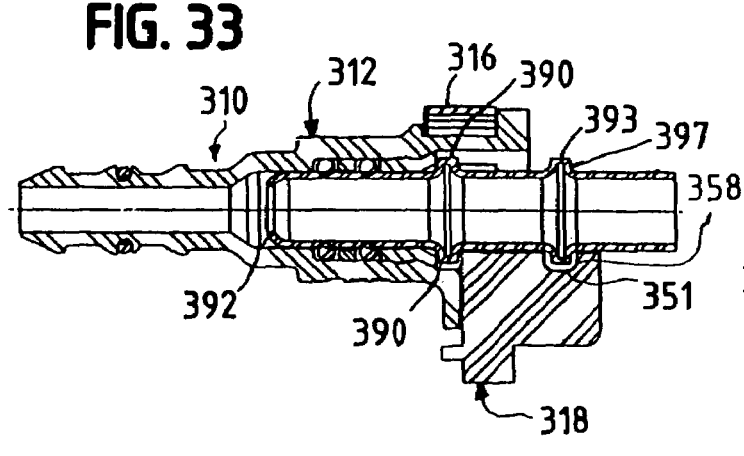
FIG. 33 is a side view, in section, of the quick connector coupling of FIG. 31.

As best seen in FIG. 33, the male member 314 differs somewhat from the male member of the embodiments of FIGS. 1-30. The male member 314 includes a tip or end 392 and an upset 390 spaced a given distance from the tip. The male member 314 also includes a second upset 393 spaced a given distance from upset 390 along the tube in a direction away from tip 392. The upset 393 includes a radial annular surface 397.

The male member 314 coacts with the female body 312, primary retainer 316 and secondary latch/verifier 318 in the manner described in connection with the embodiments of FIGS. 1-30. In this embodiment, however, when tube member 314 is fully inserted into connector body 312, and releasably secured by the primary retainer 316 and secondary latch/verifier 318, the second upset 393 is exposed outward of the connector body.

As illustrated in FIGS. 31-34, the secondary latch/verifier 318 includes all of the elements described in connection with the embodiment of FIGS. 19-30. In addition, it includes a forwardly directed support bar 346 extending forward parallel to the axis 324 of the connector body 312 that supports a transverse external latch/verifier 348. The external latch/verifier 348 and support bar 346 are connected to a strengthening web integrally molded to the bar 345, external latch/verifier 348 and secondary latch/verifier 318.

Figure 34:
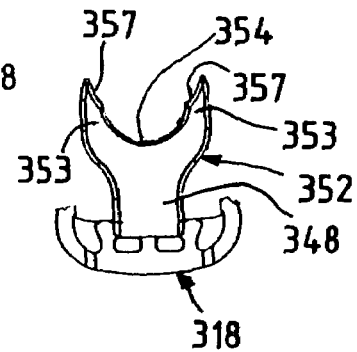
FIG. 34 is a fragmentary view of a secondary latch/verifier component of the embodiment of FIG. 31.

As illustrated in FIG. 34, the external latch/verifier 348 extends radially from support bar 346 and terminates a transverse flange 352 having legs 353. The flange 352 includes an inner curved surface 354 that is generally the same curvature as the outer cylindrical surface of tube 312. The transverse outer extent of the legs 353 have short curved segments 357 that have about the same curvature as the outer curved surface of second upset 393.

The axial length of bar 346 and the radial length of external latch/verifier 348 is such that when secondary latch/verifier 318 is in the latched position the inner curved surface 354 resides in closely spaced facing relation to the male member 314 behind or outward of radial surface 397 of second upset 393. The flange defines a transverse abutment surface 358 positioned in axial abutting relation to the annular outer radial surface 397 of male member 314. In the event that the male member 314 is not fully inserted into the connector body 312 and the first upset is not captured inward of the legs of the primary retainer 316 and the retainer beam of the secondary latch/verifier 318, the short curved segments 357 will contact the outer circumference of the second upset 393 and provide a visual indication of the absence of a proper connection.

As best seen in FIG. 33, web 350 includes cut-out area 351 that provides clearance between the web 350 and second upset 393 when the male member or tube 314 is fully inserted into connector body 312. The connector body 312 includes a forward slot, such as slot 41 illustrated in connection with the embodiment of FIGS. 1-18 to accommodate the presence of web 350. Web 350 is slidable within the slot, radially of the inner bore of the connector body 312 with movement of secondary latch/verifier 318 between its latched and unlatched positions.

Various features of the present invention have been explained with reference to the embodiments shown and described. It must be understood that numerous modifications may be made without departing from the spirit and scope of the invention as defined by the appended claims.

The invention claimed is:

1. A quick connector coupling for forming a severable connection in a fluid line comprising:
   a connector body defining a through bore extending from a male reception end of said connector body;
   said body defining a retainer housing section having slots open to said through bore;
   a primary retainer member to releasably secure a tubular male member within said connector body, releasably coupled to said connector body and including spaced apart legs disposed within slots in said body, said legs being movable between a locked position and a released position in which the spacing between said legs is increased;
   a separate secondary latch/verifier member releasably coupled to said connector body, disposed within slots in said body and movable relative to said connector body toward and away from said primary retainer between an unlatched position and a latched position; and
   wherein said secondary latch/verifier includes a retainer beam slidable in one of said slots in said body separate from said slots receiving said legs of said primary retainer.

2. A quick connector coupling as claimed in claim 1 wherein said legs include free ends, and said secondary latch/verifier includes lateral portions comprising a pair of resilient fingers extending from a connecting member, said fingers having free ends positioned laterally outward of said free ends of said legs when said secondary latch/verifier is in said latched position.

3. The quick connector coupling as claimed in claim 2 wherein said legs and said fingers are sized such that said legs are movable from said locked position to said released position only if said secondary latch/verifier is positioned in said unlatched position.

4. The quick connector coupling as claimed in claim 3 wherein on movement of said secondary latch/verifier from said unlatched to said latched position said fingers of said secondary latch/verifier contact said free ends of said legs of said primary retainer if said legs are in said released position, said contact preventing said secondary latch/verifier from being positioned in said latched position.

5. The quick connector coupling as claimed in claim 2 wherein said legs are connected by a cross member and are movable laterally between said locked and released positions by pressing said cross member toward said connector body.

6. The quick connector coupling as claimed in claim 5 wherein said connector body includes a top support member, a pair of side support members spaced therefrom and defining a pair of top slots between said top support member and said side support members, said body further includes a pair of center support members and a pair of bottom support members, said center support members and said bottom support members defining a pair of side slots and a bottom slot, said cross member of said primary retainer overlying said top support member with said legs extending through said top slots, said free ends of said legs exposed in said side slots, said connecting member of said secondary latch/verifier overlying said bottom slot with said fingers disposed in said side slots.

7. A quick connector coupling as claimed in claim 6 wherein said bottom support members include laterally directed locking ridges, said free end of said fingers each defining hooks having notches, said notches releasably receiving said locking ridges when said secondary latch/verifier is in said unlatched position.

8. A quick connector coupling as claimed in claim 7 wherein said fingers include retention lands, said retention lands receiving said locking ridges when said secondary latch/verifier is in said latched position.

9. A quick connector coupling as claimed in claim 8 wherein said fingers define transition surfaces between said notches and said retention lands.

10. A quick connector coupling as claimed in claim 9 wherein said center support members each define a locking shoulder and said free ends of said legs each define a latch, said latch of each said leg releasably secured to a locking shoulder of one of said center support members when said primary retainer is in said locked position.

11. The quick connector coupling as claimed in claim 10 wherein said retainer beam is slidable in said bottom slot, toward and away from said through bore, and said retainer beam is of a length such that it is exposed in said through bore when said secondary latch/verifier is in said latched position.

12. The quick connector coupling as claimed in claim 11 wherein said retainer beam includes a radially inner tube facing surface to contact a male member when the male member has not been sufficiently inserted into the connector body, and prevent said secondary latch/verifier from being positioned to said latched position from said unlatched position.

13. The quick connector coupling as claimed in claim 12 wherein said retainer beam includes a surface for axial abutting contact with a male tubular member when the male member is fully inserted into the connector body.

14. The quick connector coupling as claimed in claim 11 wherein said retainer beam includes a surface for axial abutting contact with a male tubular member when the male member is fully inserted into the connector body.

15. The quick connector coupling as claimed in claim 11 wherein said retainer beam includes an angled ramp surface facing toward said male member reception end of said connector body and exposed in said through bore when said secondary latch/verifier is in said latched position.

16. The quick connector coupling as claimed in claim 15 wherein said angled ramp surface is disposed at an angle of about 30° to the longitudinal axis of the through bore of said connector body.

17. The quick connector coupling as claimed in claim 11 further including a male member extending into said male reception end of said connector body and into said through bore, said male member having a tubular surface and an annular upset having a greater diameter than said tubular surface, said legs of said primary retainer releasably retaining said tubular member within said connector body when in said locked position.

18. The quick connector coupling as claimed in claim 6 further including a male member extending into said male reception end of said connector body and into said through bore, said male member having a tubular surface and an annular upset having a greater diameter than said tubular surface, said legs of said primary retainer releasably retaining said tubular member within said connector body when in said locked position.

19. The quick connector coupling as claimed in claim 18 wherein said legs of said primary retainer include surfaces for axial abutting relation to said upset when said tubular member is fully inserted into said through bore.

20. The quick connector coupling as claimed in claim 2 wherein said secondary latch/verifier further includes a rim extending axially from said connecting member, said rim including a radially inward edge having a shape matching the shape of said connector body, said rim axially positions said secondary latch/verifier relative to said connector body.

21. A coupling as claimed in claim 20 wherein said secondary latch/verifier includes a tube verifier, said tube verifier including a curved surface adapted to be positioned in closely spaced facing relation to said the male member outward of said connector body when said secondary latch/verifier is in said latched position.

22. The quick connector coupling as claimed in claim 1 wherein said retainer beam slidable in one of said slots, toward and away from said through bore, is of a length such that it is exposed in said through bore when said secondary latch/verifier is in said latched position.

23. The quick connector coupling as claimed in claim 22 wherein said retainer beam includes a radially inner tube facing surface to contact a male member when the male member has not been sufficiently inserted into the connector body, and prevent said secondary latch/verifier from being positioned to said latched position from said unlatched position.

24. The quick connector coupling as claimed in claim 23 wherein said retainer beam includes a surface for axial abutting contact with a tubular male member when the male member is fully inserted into the connector body.

25. The quick connector coupling as claimed in claim 22 wherein said retainer beam includes a surface for axial abutting contact with a tubular male member when the male member is fully inserted into the connector body.

26. The quick connector coupling as claimed in claim 22 wherein said retainer beam includes an angled ramp surface facing toward said male member reception end of said connector body and exposed in said through bore when said secondary latch/verifier is in said latched position.

27. The quick connector coupling as claimed in claim 26 wherein said angled ramp surface is disposed at an angle of about 30° to the longitudinal axis of the through bore of said connector body.

28. The quick connector coupling as claimed in claim 22 further including a male member extending into said male reception end of said connector body and into said through bore, said male member having a tubular surface and an annular upset having a greater diameter than said tubular surface, said legs of said primary retainer releasably retaining said tubular member within said connector body when in said locked position.

29. The quick connector coupling as claimed in claim 1 further including a male member extending into said male reception end of said connector body and into said through bore, said male member having a tubular surface and an annular upset having a greater diameter than said tubular surface, said legs of said primary retainer releasably retaining said tubular member within said connector body when in said locked position.

30. The quick connector coupling as claimed in claim 29 wherein said tubular male member includes a second upset spaced from said first upset and exposed outward of said male member reception end of said connector body when said male member is fully inserted in said through bore and said secondary latch verifier includes a transverse flange having an inner curved surface, said surface positionable in closely spaced facing relation to said tubular male member only if said tubular male member is fully inserted into said through bore and said secondary latch/verifier is in said latched position said transverse flange including a surface in axial abutting contact with said second upset when said secondary latch/verifier is in said latched position.

31. The quick connector coupling as claimed in claim 29 wherein said legs of said primary retainer include surfaces for axial abutting relation to said upset when said tubular member is fully inserted into said through bore.

32. A quick connector comprising:
a connector body defining a through bore extending about a central axis from a male reception end of said connector body;
said body defining a retainer housing section having at least one slot open to said through bore;
a latch/verifier member releasably coupled to said connector body, and supported for slidable movement relative to said connector body transversely of said central axis from an unlatched position to a latched position relative to said connector body, said latch/verifier including a retainer beam disposed in said at least one slot in said body, said beam is of a length such that it is exposed in said through bore when said latch/verifier is in said latched position; and
wherein said at least one slot defined by said connector body is "T" shaped in cross section in a plane parallel to said central axis and said retainer beam of said latch/verifier is "T" shaped in cross section in a plane parallel to said central axis, said retainer beam being slidably supported in such slot.

33. The quick connector comprising:
a connector body defining a through bore extending about a central axis from a male reception end of said connector body;
said body defining a retainer housing section having at least one slot open to said through bore; and a latch/verifier member releasably coupled to said connector body, and supported for slidable movement relative to said connector body transversely of said central axis from an unlatched position to a latched position relative to said connector body, said latch/verifier including a retainer beam disposed in said at least one slot in said body, said beam is of a length such that it is exposed in said through bore when said latch/verifier is in said latched position, said quick connector further including a male member extending into said male reception end of said connector body and into said through bore, said male member having a tubular surface and an annular upset having a greater diameter than said tubular surface, said retainer beam releasably retaining said tubular member within said connector body when said latch/verifier member is in said latched position.

34. The quick connector as claimed in claim 33 wherein said retainer beam includes a radially inner facing surface to radially contact said upset on said male member when the male member has not been sufficiently inserted into the connector body, and prevent said latch/verifier from being positioned to said latched position from said unlatched position.

35. The quick connector as claimed in claim 33 wherein said retainer beam includes a surface for axial abutting contact movable into axial abutting relationship with said male member when the male member is fully inserted into the connector body and said latch/verifier member is in said latched position.

36. The quick connector as claimed in claim 33 wherein said retainer beam includes an angled ramp surface facing toward said male member reception end of said connector body and exposed in said through bore when said latch/verifier is in said latched position.

37. A quick connector as claimed in claim 33 wherein said retainer beam extends from a connection member and includes a pair of resilient fingers extending from said connecting member in the same direction as said retainer beam said beam and said fingers being slidable relative to said body when said latch/verifier member is moved between said latched and unlatched positions.

38. A quick connector coupling for forming a joint in a fluid line system comprising:
a female connector body having slots formed therethrough, and a through bore extending from an end of said connector body;
a male member extending through said end of said connector body and into said bore, said male member having a tubular surface and an annular upset, said upset having a diameter greater than the diameter of said tubular surface;
a primary retainer coupled to said connector body, said primary retainer including a cross member and two spaced legs extending from said cross member and through said slots, said legs in abutting relationship with said male member upset, said legs in a locked position in which said legs are spaced apart a distance less than the diameter of said upset;
a secondary latch/verifier separately coupled to said connector body, said secondary latch/verifier including two fingers, each finger having a portion positioned laterally outward of one of said legs; and
wherein said secondary latch/verifier further includes a beam in axial abutting relationship with said male member upset.

39. The coupling as claimed in claim 38 wherein the radially inner surface of said beam abuts the radially outer surface of said upset if the male member has not been sufficiently inserted into the connector body.

40. The coupling as claimed in claim 38 wherein said beam is movable to the axial abutting relationship with said male member upset only if the male member has been sufficiently inserted into the connector body.

41. A quick connector coupling for forming a joint in a fluid line system comprising:
   a generally cylindrical female connector body having slots formed therethrough, and a through bore extending from an end of said connector body;
   a male member extending through said end of said connector body and into said bore, said male member having a tubular surface and an annular upset, said upset having a diameter greater than the diameter of said tubular surface;
   a primary retainer coupled to said connector body, said primary retainer including a cross member and two spaced legs extending from said cross member and through said slots, said legs in abutting relationship with said male member upset, said legs in a locked position in which said legs are spaced apart a distance less than the diameter of said upset;
   a secondary latch/verifier separately coupled to said connector body, said secondary latch/verifier including two fingers and a connecting member joining said fingers, each finger having a portion positioned laterally outward of one of said legs; and
   wherein said secondary latch/verifier further includes a rib extending axially from said connecting member and a rim connected to said connecting member by said rib, said rim including a radially inward edge having a curvature matching the curvature of said cylindrical connector body, said rim axially positions said secondary latch/verifier relative to said connector body.

42. A quick connector coupling for forming a joint in a fluid line system comprising:
   a female connector body having slots formed therethrough, and a through bore extending from an end of said connector body;
   a male member extending through said end of said connector body and into said bore, said male member having a tubular surface and an annular upset, said upset having a diameter greater than the diameter of said tubular surface;
   a primary retainer coupled to said connector body, said primary retainer including a cross member and two spaced legs extending from said cross member and through said slots, said legs in abutting relationship with said male member upset, said legs in a locked position in which said legs are spaced apart a distance less than the diameter of said upset, said legs are approximately perpendicular to the axis of the bore when viewed from the side; and
   a secondary latch/verifier coupled to said connector body, said secondary latch/verifier including a retainer beam in axial abutting relationship with said male member upset.

43. The coupling as claimed in claim 42 wherein the radially inner surface of said retainer beam abuts the radially outer surface of said upset if the male member has not been sufficiently inserted into the connector body.

44. The coupling as claimed in claim 43 wherein said secondary latch/verifier further includes a rim, said rim axially positions said secondary latch/verifier relative to said connector body.

45. The coupling as claimed in claim 42 wherein said retainer beam is movable to said axial abutting relationship with said male member upset only if the male member has been sufficiently inserted into the connector body.

46. A quick connector coupling for forming a severable connection in a fluid line comprising:
   a connector body defining a through bore extending about a central axis from a male reception end of said connector body;
   said body defining a retainer housing section having slots open to said through bore;
   a primary retainer member to releasably secure a tubular male member within said connector body, releasably coupled to said connector body and including spaced apart legs disposed within slots in said body, said legs being laterally movable between a locked position and a released position in which the spacing between said legs is increased;
   a separate secondary latch/verifier member releasably coupled to said connector body, disposed within slots in said body and supported for slidable movement relative to said connector body transversely of said central axis toward and away from said primary retainer between an unlatched position and a latched position; and
   wherein said secondary latch/verifier includes a retainer beam slidable in one of said slots in said body.

47. A quick connector coupling as claimed in claim 46 wherein said one of said slots receiving said retainer beam is "T" shaped in cross section in a plane parallel to said central axis and said retainer beam of said secondary latch/verifier is "T" shaped in cross section in a plane parallel to said central axis.

48. A quick connector coupling as claimed in claim 47 wherein said retainer beam extends from a connection member and said secondary latch/verifier including a pair of resilient fingers extending from said connection member in the same direction as said retainer beam.

49. The quick connector coupling as claimed in claim 48 wherein said retainer beam includes an angled ramp surface facing toward said male member reception end of said connector body.

50. The quick connector coupling as claimed in claim 49, wherein said angled ramp surface is disposed at an angle of about 30° to the longitudinal axis of the through bore of said connector body.

51. The quick connector coupling as claimed in claim 49 further including a male member extending into said male reception end of said connector body and into said through bore, said male member having a tubular surface and an annular upset having a greater diameter than said tubular surface, said legs of said primary retainer releasably retaining said tubular member within said connector body when in said locked position.

* * * * *